L. MONEUSE.
TEA AND OTHER SPOUT PROVIDED KETTLE.
APPLICATION FILED SEPT. 25, 1913.
1,137,515.
Patented Apr. 27, 1915.
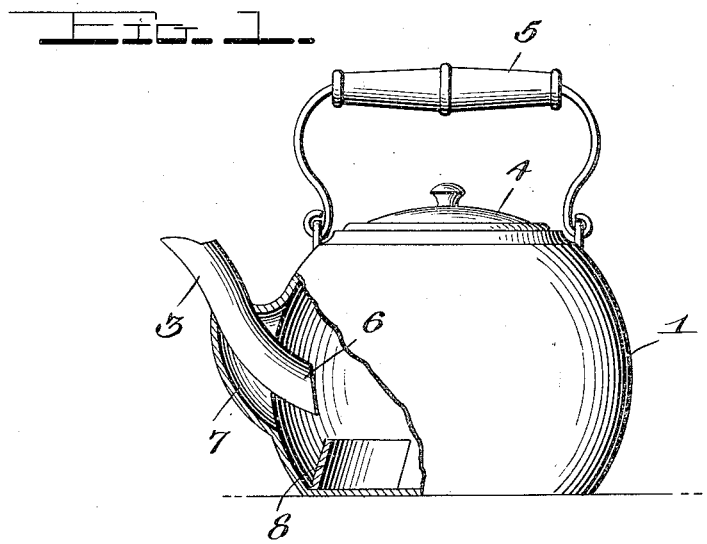
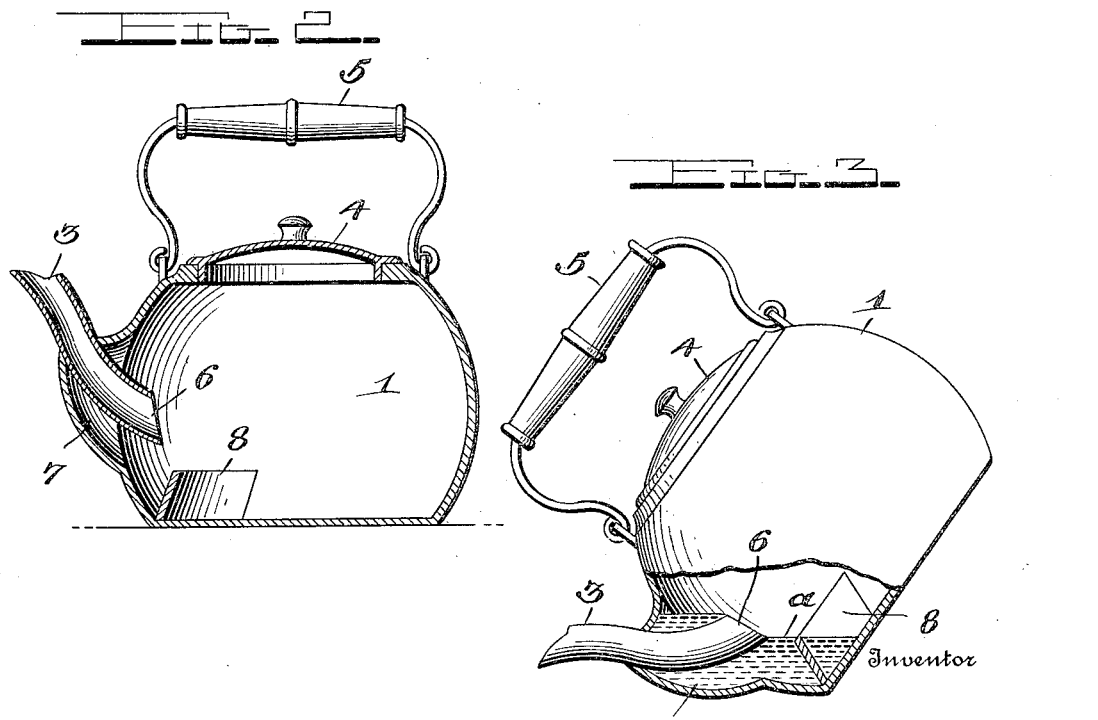

UNITED STATES PATENT OFFICE.

LOUISE MONEUSE, OF NEW ROCHELLE, NEW YORK.

TEA AND OTHER SPOUT-PROVIDED KETTLE.

1,137,515. Specification of Letters Patent. Patented Apr. 27, 1915.

Application filed September 25, 1913. Serial No. 791,834.

*To all whom it may concern:*

Be it known that I, LOUISE MONEUSE, a citizen of the United States, residing at New Rochelle, in the county of Westchester and State of New York, have invented certain new and useful Improvements in Tea and other Spout-Provided Kettles, of which the following is a specification.

The invention relates to tea and other spout-provided kettles in which water is boiled; and it has for its chief object to protect this type of kettle from the injurious effects of being inadvertently or carelessly left on the stove or fire without containing a sufficient quantity of water to prevent burning or opening of seams.

The invention consists in providing the spout of the kettle with an inner extension, so arranged as to prevent all of the contents being emptied, but that will leave a portion of the contents remaining within the kettle, an amount sufficient to prevent the burning of the kettle, or the seams opening.

The invention further consists in providing an additional means to aid or assist in preventing all of the contents being emptied from the kettle.

The invention still further consists in the specific construction and arrangement of the several parts, as will be hereinafter fully described in this specification, and briefly stated in the claim.

In the drawings—Figure 1 is a side elevation of a tea-kettle, partly broken away to show my improvements applied thereto; Fig. 2 is a central, longitudinal section thereof, and Fig. 3 is a side elevation of the kettle in tilted position, partly broken away to show the confined water, after the kettle has been emptied of all the contents possible.

Referring to the several views, the numeral 1 indicates an ordinary tea-kettle; 3 the spout; 4 the lid, and 5 the handle thereof, which several parts may be of any approved construction, and of any suitable material.

In constructing the kettle, the spout is extended inwardly, as shown at 6, to provide a water-retaining space 7 beneath the extension, and surrounding it.

By referring to Fig. 3, it will be noted that the confined water is between the dotted line $a$ and the front wall of the kettle, and is amply sufficient, when the kettle is placed on its bottom on the stove, to protect the bottom from burning.

It will be obvious that no matter how far the kettle is tilted forward, the confined water cannot pass out through the spout, as the entrance of the spout extension is placed at a height above the kettle bottom sufficient to prevent it.

In addition to the spout-extension and the location of its entrance end above the bottom, I may provide a curved partition 8, a slight distance below the spout-extension, near its entrance, to further prevent the confined water from entering the spout-extension, but it will be understood that the curved partition is employed only as a precautionary measure, as the spout-extension and its location, relative to the kettle is all that is required to retain the water in the kettle.

Having thus fully described my invention what I claim is—

A tea kettle or similar spouted vessel having a retaining space formed in its body, a spout carried by the body and having an inner extension which extends through the retaining space and into the body so that when the kettle is tilted water will fill the retaining space, a baffle plate mounted upon the bottom of the body, said inner extension having its inner end spaced above the upper edge of the baffle plate, and above the bottom of the kettle, said baffle plate serving to retard the flow of water to the spout and retaining space when the kettle is tilted.

In testimony whereof I affix my signature in presence of two witnesses.

LOUISE MONEUSE.

Witnesses:
 FRANK G. SCHRENKEISEN,
 MARGARET DIXON.

Copies of this patent may be obtained for five cents each, by addressing the "Commissioner of Patents, Washington, D. C."